Dec. 31, 1957 C. C. HUTCHINS ET AL 2,818,540

ELECTRIC MOTOR

Filed Oct. 26, 1954

INVENTORS
CHARLES C. HUTCHINS
& BLAIR C. SEAMAN
BY
ATTORNEYS

United States Patent Office 2,818,540
Patented Dec. 31, 1957

2,818,540

ELECTRIC MOTOR

Charles C. Hutchins and Blair C. Seaman, Ridgway, Pa., assignors to Hutchins Electric Company, Inc., Ridgway, Pa., a corporation of Pennsylvania Application October 26, 1954, Serial No. 464,827

3 Claims. (Cl. 318—220)

This invention relates to electric motors and, more particularly, to motors of the single phase variety which are arranged to be started by the so-called phase splitting action.

Broadly, the invention relates to an arrangement of motor windings wherein self-starting and high starting torques are provided by the utilization of mutual reactance effects between windings either inside or outside the motor shell and in which all of the windings are conductively connected to a source of power both during motor starting and during motor running conditions such as is not the case when condensers are employed in series with any of the windings.

This invention represents a further development of the general type of motor disclosed in Patent No. 2,649,-561 to C. C. Hutchins, and in our copending patent applications Serial No. 177,634, filed August 4, 1950, now Patent No. 2,697,809, Serial No. 182,329, filed August 30, 1950, now Patent No. 2,697,810, Serial No. 250,276, filed October 8, 1951, now Patent No. 2,703,859, and Serial No. 361,564, filed June 15, 1953, and of the motor disclosed in our copending patent application Serial No. 379,124, filed September 9, 1953, now Patent No. 2,779,-907. In the motor disclosed herein, a part of a balancing or current controlling action serving to control the currents flowing in displaced motor windings is provided by mutual inductance between winding coils within the motor and a part is provided by mutual inductance between winding coils external to the motor. It has been found that with proper distribution of a portion of the mutually inductive coils of the motor windings within the motor and with the remainder of the mutually inductive coils being located externally of the motor the mutually inductive coils can be made to govern the magnitude and phase displacement of the current flowing in one of the windings to provide susbstantial phase displacement between currents in the motor windings during starting of the motor and to control the current circulating between the windings during running of the motor without requiring any change in slot design of a conventional single phase induction type motor.

More specifically, it is among the objects of this invention to provide a motor which does not require the use of centrifugal switches, relays and/or capacitors, and to provide motor windings which can be applied to conventional induction motor stator frame slot arrangements without requiring any change in slot design and which can be machine wound in the conventional fashion. It will be evident that such a motor may be produced at low cost and without the necessity of special tooling.

These and other objects of the invention will become apparent from the following description when read in conjunction with the accompanying drawings in which.

Figure 1:
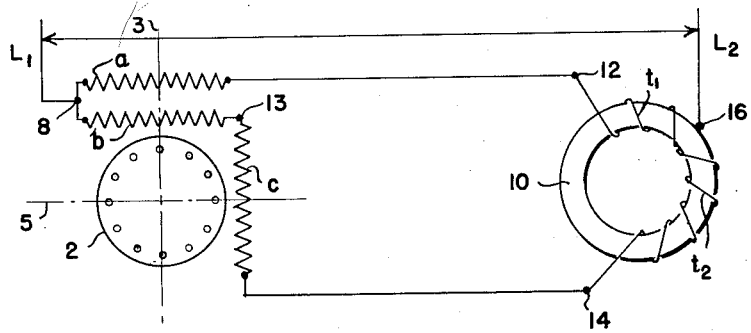
Figure 1 is a conventional motor diagram showing motor windings arranged in accordance with this invention.

Referring to Figure 1 there is shown a diagrammatic form of squirrel cage rotor 2 which may be in the form of any of the various types of squirrel cage rotors or other types of rotors suitable for operation with induction motors.

Figure 2:
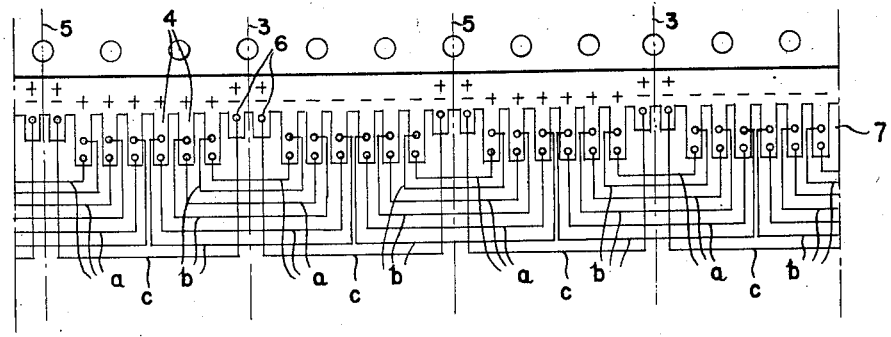
Figure 2 is a plane development of windings such as shown in Figure 1 distributed in winding slots.

Windings $b$ and $c$ are shown in series relation displaced at an angle of 90° with respect to each other as indicated by winding axes center lines 3 and 5. A third winding $a$ is positioned on the same center line as the winding $b$. As shown in Figure 2, the windings $a$ and $b$ are positioned in mutually inductive relation in winding slots 4 and the winding $c$ is positioned in auxiliary slots 6. While the winding $c$ has been shown as spaced 90 electrical degrees from the winding $a$, this displacement is not necessarily limited to 90 electrical degrees in all motors. In some motors it will be desirable to modify this angle in order to provide better governing of the currents flowing in the motor circuit.

The windings $a$ and $b$ are connected together at one end at a common point 8 which is connected to power line $L_1$. The other end of the $a$ winding is connected at terminal 12 to one end of a coil $t_1$ which is wound on a core 10 indicated diagrammatically as a toroidal core in Figure 1. As previously noted, the $b$ and $c$ windings are connected in series. The open end of the $c$ winding is connected at 14 to one end of a coil $t_2$ also wound on the core 10. The other ends of the coils $t_1$ and $t_2$ are connected together at a terminal 16 to which is also connected a power line $L_2$.

Figure 3:
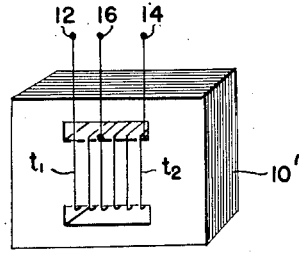
Figure 3 is a perspective view of the external balancing means employed.

The balancing coil assembly shown diagrammatically in Figure 1 is shown in Figure 3 as comprising a laminated coil frame 10' on which is wound the coils $t_1$ and $t_2$ having the terminals 12, 16 and 14 brought out as indicated for connection with the motor windings $b$ and $c$ and the power line $L_2$.

Figure 2 is presented to make clear a typical winding arrangement as may be employed on a stator core. The stator 7 is shown in a plane development with main winding slots indicated at 4 and auxiliary slots indicated at 6. A four-pole winding is illustrated with the windings $a$ and $b$ occupying six slots of the eight slots per pole shown and the winding $c$ occupying two slots of the eight slots per pole. It will be evident that other numbers of slots may be employed and other divisions of the employed slots may be involved. Generally, however, the $c$ winding will occupy slots not occupied by the $a$ and $b$ windings. The coils shown in Figure 2 may be spiral, lap or otherwise wound in numerous conventional fashions with the coils of each pole in series, parallel or part series and part parallel arrangement as is well known in the art.

Instantaneous polarities of the windings $a$ and $b$ are indicated above the slots. Motor rotation may be reversed by interchanging the end connections 13 and 14 of the $c$ winding. Thus in Figure 2 the polarities of the $c$ winding will be either that shown by the top row of the polarity signs or that shown by the bottom row of polarity signs over the winding slot 6 depending upon the desired rotational direction of the motor. It will be evident that all of the windings may be prewound and inserted in the winding slots in the conventional fashion.

While the relative numbers of turns of the various windings will be determined by the physical proportions of any particular motor being wound and the particular characteristics which are desirably obtained from that motor, generally speaking, a typical motor of the type shown in Figure 1 will have lesser number of turns in the $b$ winding than in the $a$ winding and lesser number of turns in the $t_1$ coil than in the $t_2$ coil. More specifically, a satisfactory motor can be produced by providing the $a$ winding with approximately 10 to 20% less turns than is normally provided on the running winding of a similar size standard split phase motor, by providing the $b$ winding with 20 to 35% less turns than the $a$ winding, and by providing the $c$ winding with approximately 20% of the number of turns of the $a$ winding. A typical external balancing coil will have, for example, a core section of approximately one inch by one inch for a one-third horse power 1750 R. P. M. motor with approximately 130 to 150 turns of wire in which the coil $t_1$ includes approximately 15 to 20% of the total number of turns. For adjusting current balance in any particular motor, it is a simple matter to provide a balancing coil having a plurality of available taps from which the most desirable tap can be selected by a trial and error procedure.

Figure 4:
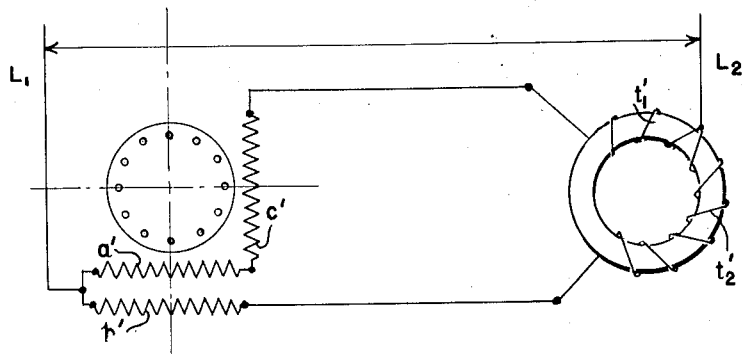
Figure 4 is a conventional motor diagram showing an alternative form of motor windings arranged in accordance with this invention.

It should be noted that the 90° winding, the $c$ winding shown in Figure 1, may be connected in series with the $a$ winding, as shown in Figure 4, in which the mutually inductive $a'$ and $b'$ windings are connected together at one end and connected to power $L_1$, the opposite end of the $b'$ winding is connected to one end of the balance coil $t'_2$ and the end of the $c'$ winding not connected to the $a'$ winding is connected to one end of the balance coil $t'_1$. The opposite ends of the two balancing coils are connected to power line $L_2$. With regard to the winding turn figures given above, in a motor of the form shown in Figure 4, the $a'$ and $b'$ windings will have approximately the same number of turns as the $a$ and $b$ windings indicated above, but the $c'$ winding will preferably have only approximately 12 to 15% of the number of turns of the $a'$ winding.

It will be evident that winding coils distributed as shown in Figure 2 may be connected in accordance with the diagrammatic showing of Figure 4.

It will be evident that in the arrangement shown in Figure 1 the $a$ winding may be considered as the running winding and the phase displacement between the currents in the $a$ and $c$ windings and the physical displacement between these windings will give rise to starting torque. In the arrangement shown in Figure 4 the $a'$ winding may be considered as the running winding and the phase displacement between the currents flowing in the $b'$ and $c'$ windings and the physical displacement between the $b'$ and $c'$ windings will give rise to starting torque. In each of these arrangements the mutually inductive relation between the $a$ and $b$ windings internally of the motor and the mutually inductive relation between the coils $t_1$ and $t_2$ externally of the motor serves to provide the governing or controlling action referred to governing the magnitude and phase displacement of the currents flowing in the windings providing starting torque and limiting the current circulating between the windings during running of the motor.

The motor disclosed herein is of such a form as to employ motor winding slots of conventional size, distribution and number while also employing a relatively small external balancing coil. A great variety of arrangements of windings, cores and turns may be used consistently with what is disclosed herein in a manner entirely similar to design adjustments of polyphase practice as those skilled in the art will immediately appreciate.

The motor disclosed herein is similar to the various motors disclosed in our above mentioned prior patent applications in that, by virtue of the mutual inductance between two windings, the current flowing in one of the mutually inductive windings is made to control the phase angle and magnitude of the current flowing in the other of the two mutually inductive windings. Thus there is provided a balancing or controlling action by means of which the current in the two windings is displaced to provide the split phase condition required to give rise to starting torque, and there is also provided current limiting means and/or current magnitude controlling means preventing circulating currents of undesirable magnitude among the windings during normal running of the motor. Heretofore it has not been recognized among those skilled in the electric motor art that a motor such as this can be made to operate in the manner described with all of the windings conductively connected to a source of power at all times during operation of the motor.

What is claimed is:

1. A self-starting alternating current electric motor comprising a rotor member and a stator member, one of said members including means adjacent to the other of said members for the reception of windings, a first winding and a second winding, said windings each having winding turns distributed in said winding receiving means, said windings each having winding turns in mutually inductive relation with winding turns of the other winding, a third winding connected to said second winding and having winding turns distributed in said winding receiving means, a first coil connected to said first winding, a second coil connected to said third winding, said first and second coils having turns in mutually inductive relation and displaced from said winding receiving means, and means conductively connecting said windings and coils across a source of alternating current, said mutually inductive turns of said windings and said mutually inductive turns of said coils providing mutual inductance governing the magnitude and phase displacement of the current flowing in one of said windings to produce substantial phase displacement between the current in the windings during starting of the motor and to control the current circulating between the windings during running of the motor.

2. A self-starting alternating current electric motor comprising a rotor member and a stator member, one of said members including means adjacent to the other of said members for the reception of windings, a first winding and a second winding connected in series, said windings each having winding turns distributed in said winding receiving means, said windings each having winding turns in mutually inductive relation with winding turns of the other winding, a third winding connected in series with said second winding and having winding turns distributed in said winding receiving means, a first coil connected in series with said first winding, a second coil connected in series with said third winding, said first and second coils having turns in mutually inductive relation and displaced from said winding receiving means, and means conductively connecting said windings and coils across a source of alternating current, said mutually inductive turns of said windings and said mutually inductive turns of said coils providing mutual inductance governing the magnitude of phase displacement of the current flowing in one of said windings to produce substantial phase displacement between the current in the windings during starting of the motor and to control the current circulating between the windings during running of the motor.

3. A self-starting alternating current electric motor comprising a rotor member and a stator member, one of said members including means adjacent to the other of said members for the reception of windings, a first winding and a second winding, said windings each having winding turns distributed in said winding receiving means, said windings each having winding turns in mutually inductive relation with winding turns of the other winding, a third winding connected to said second winding and having winding turns distributed in said winding receiving means and positioned with their polar axes displaced less than 180 electrical degrees from the polar axis of winding turns of said first winding, a first coil connected to said first winding, a second coil connected to said third winding, said first and second coils having turns in mutually inductive relation and displaced from said winding receiving means, and means conductively connecting said windings and coils across a source of alternating current, said mutually inductive turns of said windings and said mutually inductive turns of said coils providing mutual inductance governing the magnitude and phase displacement of the current flowing in one of said windings to produce substantial phase displacement between the current in the windings during starting of the motor and to control the current circulating between the windings during running of the motor.

References Cited in the file of this patent

UNITED STATES PATENTS

| | | |
|---|---|---|
| 1,859,368 | Kennedy | May 24, 1932 |
| 1,894,124 | Schaefer | Jan. 10, 1933 |
| 1,912,338 | Kennedy | May 30, 1933 |
| 2,649,561 | Hutchins | Aug. 18, 1953 |
| 2,697,809 | Hutchins et al. | Dec. 21, 1954 |
| 2,697,810 | Hutchins et al. | Dec. 21, 1954 |
| 2,703,859 | Hutchins et al. | Mar. 8, 1955 |